3,247,060
METHODS FOR CONTROLLING BIRDS WITH HALOGENATED - 4 - LOWER ALKYL ANILINE AND NITROBENZENE COMPOUNDS
Emanuel Waletzky, 1073 Princeton-Kingston Road, Princeton, N.J., and Sidney Kantor, 5 Tower Place, Trenton, N.J.
No Drawing. Filed Feb. 5, 1964, Ser. No. 342,770
15 Claims. (Cl. 167—46)

This application is a continuation-in-part of copending application Serial No. 261,821 filed February 28, 1963, and now abandoned.

This invention relates to new compositions of matter. More particularly, it relates to compositions differentially toxic to birds but not to mammals and to methods of using the same in avian control. Still more particularly, the invention is concerned with the use of differentially toxic compositions for controlling crop and structural damage and annoyance from depredatory and roosting birds.

In the past few years the destruction, hazards to health, unsanitary and unsightly conditions and general annoyance created by undesirable numbers and species of birds has become both a rural and urban problem. Among the birds falling into these categories are, for example, pigeons, starlings, grackle, red-winged blackbirds, sparrows, etc.

Estimates of damage due to depredatory and roosting birds, while difficult to ascertain because of varied nature, types and locations of loss, are very substantial. For example, the State of Ohio predicts losses of $400–500,000 annually in field corn; Virginia estimates the annual loss in peanuts, corn and milo to be $1.5 million annually; Maryland has losses of up to 5 bushels of corn per acre, while New Jersey's total loss due to birds is estimated to be $2.5–4.0 million annually; Connecticut reports losses of up to $100 per acre in blueberries and Massachusetts estimates blueberry losses at $163,000 annually. The above figures were developed in connection with proceedings of "Bird Depredation Conference," January 23 and 24, 1961, College of Agriculture, Rutgers, The State University, New Brunswick, New Jersey.

In three Western States damage attributed to blackbirds alone is estimated at $15,000,000 annually. Blackbirds, cowbirds and grackles are primarily seed eaters. (Proceedings of "Vertebrate Pest Control Conference," February 6 and 7, 1962, sponsored by California Vertebrate Pest Control Technical Committee, held in Sacramento, California.) Cereal grains are especially attractive to these birds and they swarm out of roosts in nearby marshes or woodlands to feed on such crops as rice, corn, small grains, truck crops, nuts and fruits. They also have been known to pull up seedlings in forest plantings and sprouts of agricultural crops. They attack maturing corn and have been known to strip the corn of husks making the ears vulnerable to insect attack and mold.

Starlings roost in immense flocks in trees and on buildings. In the West, these birds appear to prefer roosting in holly groves where they contaminate foliage making it unsalable. They are insect eaters but like cherries, grapes and other fruits. At cattle and poultry feeding stations they consume and contaminate considerable quantities of food. Further, the danger to aircraft created by flocks of starlings and other birds roosting and feeding in the vicinity of airports is also well documented.

While the extent of the depredations attributable to migratory or wild birds may not be fully realized by urban communities, many such communities do recognize the problems created by the more or less domesticated pigeon. These birds are generally considered to be nuisances. In nesting and roosting areas they deface the property with their litter and frequently create rather acute health hazards. In certain cities the cost for cleaning up after these birds around a single building amounts to as much as several thousand dollars annually.

With increasing recongition of the extent of loss and damage attributable to birds, rural and urban communities alike have begun to exercise control measures with respect to pest birds. Although most control measures have been designed to frighten birds from crops or buildings without harming them, with the increasing flock sizes and the ever rising cost for effective protection, it is becoming evident that local reduction in bird numbers will have to be resorted to.

The use of rifles, shotguns, firecrackers and gas exploders have been resorted to for crop protection but are not entirely satisfactory. Rifles are hazardous, shotguns have limited range, firecrackers are costly, require continued replacement and are quite dangerous to handle. Gas exploders are expensive and require electric current to operate. In vast farming areas electric current is not always available nor practical to install and maintain. Bird repellents are known, but to date none have been developed which can be used on crops destined for human or livestock consumption. Several poisons such as strychnine, sodium fluoroacetate and zinc phosphide have been used in limited quantities to locally reduce the number of birds, but because such materials are highly poisonous to humans and animals, as well as to pest birds, their usefulness is severely curtailed. While the bait itself may be located in a place inacessible to most domesticated animals the danger is ever present that a bird killed by the poison will be a secondary hazard to dogs, cats, pigs and other desirable animals.

We have now found that compositions containing compounds having the formula:

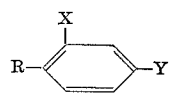

wherein R is lower alkyl, X is a halogen, Y is selected from the group consisting of $NO_2$,

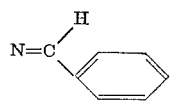

and

groups wherein $R_1$ is hydrogen, lower alkyl or lower alkanoyl and $R_2$ is hydrogen or lower alkyl and the acid addition salts thereof have the unusual property of low toxicity to mammals and much higher toxicity to birds.

The compositions of the present invention when taken internally are effective at 250 mg./kg. body weight and at much lower dosages, as low as 2 mg./kg. body weight. However, at least 15 p.p.m. are desirable when used as a component of bird feed.

For controlling birds the compounds may be mixed with diluents to form treated bait. Grains and/or seeds or pelleted feed may be dipped in solutions containing the acitve compounds, dried and placed in most likely locations for consumption by the birds. The active compounds may also be mixed with baits such as suet or peanut butter and placed at or around feeding sites for the birds.

It will be apparent to those skilled in the art that other methods of using the subject compounds will also be useful. For example, the compounds may be used as an ingredient of a dust or spray to be applied over areas where large numbers of pest birds nest, roost, or are feeding. Sprays or dusts may also be applied to growing cereal crops, fruits, buds of orchard trees, ornamental trees, or other growing plants subject to depradation or damage. The compounds in the form of liquid or solid compositions may be applied to roosting areas, such as buildings, as the toxic ingredient of an adhesive mixture which will adhere to the feet of birds landing on the areas and poison them when the birds clean themselves. The toxic material as an ingredient of a composition may also be sprayed directly on the offending birds.

The following examples describe in detail specific embodiments of compositions of the present invention. Readily available non-pest birds, e.g., chickens, are used to determine the structural chemical requirements for differential toxicity between birds, and mammals, but results show that pest species are also more susceptible than mammals.

*Example 1.—Lethal concentrations and effectiveness of 3-halo-4-lower alkylaniline and 3-halo-4-lower alkyl nitrobenzene*

The compounds to be tested are mixed with a standard chick diet comprising corn, fish meal, soya-bean meal, minerals and vitamins. A sufficient quantity of the active ingredient is added and thoroughly mixed into the feed to produce the concentrations shown in the final column designated lethal concentration in Table I below. Groups of from 5 to 10 chicks, each ranging from 1 to 4 weeks old, are then fed the test diets ad libitum for five days. By the end of the test period chicks which are fed diets containing compounds of the subject invention are dead. Chicks fed diets containing the other compounds mentioned in Table I below are apparently unaffected by the compounds.

Table I clearly indicates that the 3-halo-4-lower alkylaniline and nitrobenzene compounds exhibit a high degree of toxicity at low concentration. It can also be noted that positional isomers or analogs made by replacing or removing the alkyl and/or halo and/or amino and nitro groups with other substituents and/or adding more substituents on the benzene ring do not exhibit such toxicity even at relatively high concentrations.

TABLE I.—NON-LETHAL COMPOUNDS RELATED TO 3-HALO-p-METHYLANILINE AND 3-HALO-4-METHYLNITROBENZENE (>=NON-TOXIC AT THIS CONCENTRATION <= TOXIC AT LOWEST CONCENTRATION TESTED)

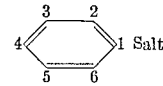

| Name | 1 | 2 | 3 | 4 | 5 | Lethal concentration, p.p.m. in diet |
|---|---|---|---|---|---|---|
| 3-iodo-4-methylaniline hydrochloride | $NH_2$ | | I | $CH_3$ | | 20 |
| 3-iodo-1,4-dimethylbenzene | $CH_3$ | | I | $CH_3$ | | >250 |
| 1-fluoro-3-iodo-4-methylbenzene | F | | I | $CH_3$ | | >250 |
| 2-methyl-4-iodoaniline | $NH_2$ | $CH_3$ | | I | | >250 |
| 2-iodo-5-methylaniline | $NH_2$ | I | | | $CH_3$ | >250 |
| 3-bromo-4-methylaniline hydrochloride | $NH_2$ | | Br | $CH_3$ | | <60 |
| 4-bromo-2-methylaniline hydrochloride | $NH_2$ | $CH_3$ | | Br | | >250 |
| 4-bromo-2-methylaniline base | $NH_2$ | $CH_3$ | | Br | | >250 |
| 3-bromoaniline | $NH_2$ | | Br | | | >500 |
| 2-bromo-4-methylaniline hydrochloride | $NH_2$ | Br | | $CH_3$ | | >250 |
| 2-bromo-4-methylaniline base | $NH_2$ | Br | | $CH_3$ | | >250 |
| 3,5-dibromo-4-methylaniline | $NH_2$ | | Br | $CH_3$ | Br | >2,000 |
| 3-chloro-4-methylaniline sulfate | $NH_2$ | | Cl | $CH_3$ | | <60 |
| 3-chloro-4-methylaniline base | $NH_2$ | | Cl | $CH_3$ | | <60 |
| 3-chloro-4-methylbenzene sulfonic acid | $HSO_3$ | | Cl | $CH_3$ | | >250 |
| 4-chloro-2-methylaniline hydrochloride (gray salt). | $NH_2$ | $CH_3$ | | Cl | | >500 |
| 3-methyl-4-chloroaniline | $NH_2$ | | $CH_3$ | Cl | | >250 |
| 2-chloro-4-methylaniline hydrochloride | $NH_2$ | Cl | | $CH_3$ | | >250 |
| 5-chloro-2-methylaniline hydrochloride | $NH_2$ | $CH_3$ | | | Cl | >250 |
| 3-chloro-4-aminoaniline | $NH_2$ | | Cl | $NH_2$ | | >250 |
| 3-fluoro-4-methylaniline | $NH_2$ | | F | $CH_3$ | | 250 |
| 3-nitro-4-methylaniline | $NH_2$ | | $NO_2$ | $CH_3$ | | >250 |
| 3-iodo-4-methylnitrobenzene | $NO_2$ | | I | $CH_3$ | | 100 |
| 3-bromo-4-methylnitrobenzene | $NO_2$ | | Br | $CH_3$ | | <250 |
| 3-chloro-4-methylnitrobenzene | $NO_2$ | | Cl | $CH_3$ | | <250 |

*Example 2.—Differential toxicity*

Compounds to be tested in single oral dosages are prepared by dissolving the same in water or suspending in a 2% agar gel in sufficient quantity to provide the concentrations disclosed in Table II, below. Groups of the animals listed in column 6 of Table II are given a single dose of the tested compounds. The compounds tested are administered in aqueous solution or agar gel suspension in dosages listed in column 7 by means of force feeding with a plastic tube and a syringe. From Table II it can be seen that as little as 3 milligrams per kilogram of body weight of a 3-halo substituted 4-lower alkyl aniline, N-substituted aniline, or nitrobenzene is lethal for chickens, turkeys and red-winged blackbirds. From 8 to 100 milligrams per kilogram of body weight are required to kill pigeons and starlings whereas the lethal dosage for mice amounted to 200 milligrams per kilogram of body weight. More than 500 milligrams per kilogram of body weight is required for toxicity to rabbits and 100 milligrams per kilogram of body weight is found to be non-lethal to dogs, producing emesis only. The production of emesis in dogs at doses as low as 10 mg./kg. body weight is advantageous, as it will further help prevent toxicity to dogs from ingestion of poisoned birds.

TABLE II.—LETHAL CONCENTRATIONS OF 3-HALO-4-LOWER ALKYLANILINES OR N-SUBSTITUTED ANILINES AND 3-HALO-4-LOWER ALKYL NITROBENZENES (>=NON-TOXIC CONCENTRATION)

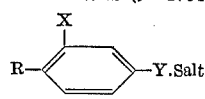

| Name | R | Y | X | Salt | Animal | Approximate lethal concentration | |
|---|---|---|---|---|---|---|---|
| | | | | | | Single oral dose, mg./kg. body weight | P.p.m. in diet (No. days fed) |
| 3-iodo-4-methylaniline | $CH_3$ | $NH_2$ | I | HCl | Chicken | 2 | 20 (7) |
| | | | | | Turkey | 3 | |
| | | | | | Red-winged blackbird | 3 | |
| | | | | | Pigeon | 25–50 | |
| | | | | | Domestic Duck | 50–100 | |
| | | | | | Mouse | 2,000 ($LD_{50}$) | >6,000 (50) |
| | | | | | Rabbit | >500 | |
| | | | | | Dog | >100 (emetic) | |
| 3-bromo-4-methylaniline | $CH_3$ | $NH_2$ | Br | HCl | Chicken | 3 | <60 (4) |
| | | | | | Red-winged blackbird | 3 | |
| | | | | | Starling | 8–14 | |
| | | | | | Mouse | 1,500 ($LD_{50}$) | |
| | | | | | Dog | >100 | |
| Do | $C_2H_5$ | $NH_2$ | Br | HCl | Chicken | <250 | |
| 3-chloro-4-methylaniline | $CH_3$ | $NH_2$ | Cl | Picrate | do | 10–20 | |
| Do | $CH_3$ | $NH_2$ | Cl | Trichloroacetate | do | 10 | |
| 3-chloro-4-methyl N-methylaniline hydrochloride | $CH_3$ | N(H)(CH_3) | Cl | HCl | do | 30 | |
| 3-chloro-N,N-dimethyl-4-methylaniline hydrochloride | $CH_3$ | N(CH_3)(CH_3) | Cl | HCl | do | 60 | |
| Benzylidene-3-chloro-4-methylaniline | $CH_3$ | N=CH-phenyl | Cl | | do | 6 | |
| N-acetyl-3-chloro-4-methylaniline | $CH_3$ | N(H)(COCH_3) | Cl | | do | 6 | |
| 3-chloro-4-methylaniline | $CH_3$ | $NH_2$ | Cl | | do | 6 | <60 (5) |
| | | | | | Mouse | >500 | |
| Do | $CH_3$ | $NH_2$ | Cl | HCl | Chicken | 6 | |
| | | | | | Starling | 3 | |
| | | | | | Sheep | >200 | |
| | | | | | Mouse | 2,000 ($LD_{50}$) | |
| | | | | | Dog | >100 (emetic at 10–100) | |

| Name | R | Y | X | Salt | Animal | Approximate lethal concentration | |
|---|---|---|---|---|---|---|---|
| | | | | | | Single oral dose, mg./kg. body weight | P.p.m. in diet (No. days fed) |
| 3-fluoro-4-methylaniline | $CH_3$ | $NH_2$ | F | | Chicken | 30 | 250(5) |
| | | | | | Mouse | >1,000 | |
| 3-iodo-4-methylnitrobenzene | $CH_3$ | $NO_2$ | I | | Chicken | 50 | |
| | | | | | Mouse | >1,000 | |
| 3-bromo-4-methylnitrobenzene | $CH_3$ | $NO_2$ | Br | | Chicken | 50 | <250(5) |
| | | | | | Mouse | >1,000 | |
| 3-chloro-4-methylnitrobenzene | $CH_3$ | $NO_2$ | Cl | | Chicken | 100 | <250(5) |
| | | | | | Mouse | >1,000 | |

*Example 3.—Differential toxicity*

Groups of 5 to 10 chicks, 1 to 4 weeks old, are fed standard diets of corn and soyabean meal containing minerals and vitamins and an active ingredient (i.e., a compound of the subject invention) in sufficient quantity to produce the given concentration in column 8 of Table II. Twenty to 250 parts per million in the chicks diet prove fatal when the chicks are fed the above diet for from 2 to 7 days. Mice fed a commercial mouse diet ground with sufficient active ingredient to provide 6000 parts per million of the compounds of the subject invention survived for more than 50 days on such a diet, further illustrating the large and useful differential between the avian and mammalian toxicity of the subject compounds.

*Example 4*

Table III below illustrates the effect of the 3-halo-4-methylaniline compounds and Table IV illustrates the effect of the 3-halo-4-methylnitrobenzene compounds when such compounds are administered to chickens in both single oral dosages and in their diets. Single oral dosages are prepared in aqueous solution or suspension to give the doses mentioned. Groups of chickens, numbering 6 or more, are force fed such solution by introducing the same directly into their crops with the aid of a syringe. Diets containing the compounds to be tested are prepared and administered in the manner described in Example 1.

From these data it appears that the acute lethal dosage for starlings range from 8 to 14 milligrams per kilogram of body weight.

TABLE III

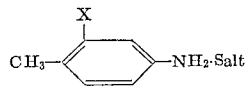

| Name Single oral dose I | X | Salt | Dead/total mg./kg. body weight | | | | | | |
|---|---|---|---|---|---|---|---|---|---|
| | | | 30 | 15 | 9 | 6 | 4 | 3 | 2 |
| 3-iodo-4-methylaniline hydrochloride. | I | HCl | | | | 6/6 | 46/46 | 38/41 | 26/50 |
| 3-bromo-4-methylaniline hydrochloride. | Br | HCl | | | | 20/20 | | 16/20 | |
| 3-chloro-4-methylaniline. | Cl | | | | 15/15 | 19/20 | | | |
| 3-chloro-4-methylaniline hydrochloride. | Cl | HCl | | | | 10/10 | 14/20 | | |
| 3-fluoro-4-methylaniline. | F | | | 8/10 | | | | | |

| Drug diet II | X | Salt | P.p.m. in diet | | |
|---|---|---|---|---|---|
| | | | 250 | 60 | 20 |
| 3-iodo-4-methylaniline hydrochloride. | I | HCl | | 10/10 | 9/19 |
| 3-bromo-4-methylaniline hydrochloride. | Br | HCl | | 10/10 | |
| 3-chloro-4-methylaniline. | Cl | | 10/10 | 8/10 | |

TABLE IV

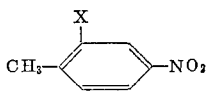

| I. Single oral dose | X | Dead/Total mg./kg. body weight | | |
|---|---|---|---|---|
| | | 200 | 100 | 50 |
| 3-iodo-4-methylnitrobenzene. | I | | 5/5 | 4/5 |
| 3-bromo-4-methylnitrobenzene. | Br | | 5/5 | 5/5 |
| 3-chloro-4-methylnitrobenzene. | Cl | 5/5 | 3/5 | |

| II. Drug diet | X | P.p.m. in diet |
|---|---|---|
| | | 250 |
| 3-bromo-4-methylnitrobenzene. | Br | 9/10 |
| 3-chloro-4-methylnitrobenzene. | Cl | 10/10 |

*Example 5*

To illustrate the range of lethal dosage in milligram per kilogram of body weight of the compounds of the subject invention, the following tests are performed.

3-bromo-4-methylaniline, hydrochloride is prepared in propylene glycol solution. Quantities of solution containing 4.5, 8, 14 and 25 milligrams of active ingredient per kilogram of body weight of starlings treated, are administered. By means of a plastic tube and a syringe, the solution is introduced directly into the crops of the test birds. Four birds are tested at each of the concentrations of 8 and 14 milligrams per kilogram of body weight, and two birds are tested at 25 milligrams per kilogram of body weight. At the latter concentration mortality is complete in from 2 to 20 hours. At 14 milligrams per kilogram of body weight all birds are killed in less than 23 hours and at 8 milligrams per kilogram of body weight, death occurred in less than 50 hours in 3 of 4 starlings. No starlings are killed after 4.5 milligrams per kilogram of body weight.

*Example 6*

Following the procedure set forth in Example 5, 3-iodo-4-methylaniline hydrochloride is also tested for effectiveness against red-winged blackbirds. Dosage concentrations tested in this series of experiments amounts to 2.5, 8.0, and 14.0 milligrams per kilogram of body weight. As mentioned above the solutions are introduced directly into the crops of the test birds and the mortality rate is recorded thereafter. It is found that at 14 milligrams per kilogram of body weight all birds are killed in less than 44 hours, at 8 milligrams per kilogram of body weight all birds are killed in less than 96 hours, and at 2.5 milligrams per kilogram of body weight death occurs in less than 67 hours.

*Example 7*

In order to demonstrate the effectiveness of the compounds of the subject invention when applied to birds as a component of a spray or dust, the following test was run.

A sufficient quantity of 3-chloro-4-methyl-aniline hydrochloride is dissolved in water to produce a 5% concentration of this active ingredient in the water. Two groups of 5 chicks each are then placed in separate, large, sealed containers and 10 and 20 cc. of the 5% mixture are atomized into said containers. The birds are kept in the vapor produced by atomization for 2 minutes and then removed and placed in separate cages where they are permitted to feed and drink ad libitum on a commercial chick diet. Though the feathers were moist, no wetting of the skin was apparent. All birds are dead two days after being sprayed.

*Example 8*

To demonstrate the effectiveness of the compounds of the subject invention against several species of pest birds, acetone solutions of 3-chloro-4-methylaniline and aqueous solutions of 3-chloro-4-methylaniline hydrochloride were prepared and given to selected species. The test birds were fasted for 4 hours and the solution of toxicant administered to separate birds in a single oral dose by intubation. Results of these tests appear in Table V below.

TABLE V

| Compounds | Species | Dose, mg./kg. | No. birds | Percent mortality |
|---|---|---|---|---|
| 3-chloro-4-methylaniline | Red-winged blackbird | 8 | 2 | 50 |
| Do | | 14 | 2 | 100 |
| | Starling | 8 | 2 | 50 |
| | Do | 14 | 2 | 100 |
| 3-chloro-4-methyl aniline hydrochloride | Red-winged blackbird | 3.16 | 2 | 100 |
| | Pigeon | 17.7 | 2 | 50 |
| | Do | 56 | 1 | 100 |
| | Blackbilled magpie | 17.7 | 2 | 100 |

*Example 9*

To determine the effectivenesses of the compounds of the subject invention when employed in the field, 3-chloro-4-methylaniline was applied to poultry pellets in 75% solution of toxicant in acetone. The pellets were dried and mixed with untreated poultry crumbles and grain sorghums to provide a bait having a ratio of treated to untreated feedstuffs of 1 to 10. Treated pellets contained 1% by weight of the toxicant. Two pounds of the bait was scattered on the grounds of two acres of cattle pens known to be the feeding site of large flocks of starlings, Brewer's blackbirds, red-winged blackbirds, English sparrows and the like. The following day ten pounds of the treated bait was again distributed over the same area. During this two day period when treated bait was distributed, an estimated 9,000 birds including about 2,500 starlings arrived at the feeding site. The following day, six-foot-wide transects spaced 200 feet apart were established in three previously scanned bird roosting areas. Dead and dying birds were collected in the established transects for five days following distribution of the treated bait. More than eleven hundred starlings and seventy-one Brewer's blackbirds were collected in the transects during this period. From these data and observations at the roosting and feeding areas, it was estimated that approximately 75% of the starlings using the cattle pens as a feeding site were eliminated. No secondary hazards to mammalian species was noted.

*Example 10*

The compounds of the subject invention employed under field conditions are shown to be highly effective against birds by the following test wherein cracked corn treated with 2% by weight of 3-chloro-4-methylaniline and mixed with untreated cracked corn and millet at a ratio of 1:100 was scattered over the ground of a two acre cattle pen adjacent a marsh which served as a roosting site for red-winged blackbirds, Brewer's blackbirds, grackles, cowbirds, yellow-headed blackbirds, English sparrows and several miscellaneous species. Birds using this roost during the test period were estimated to be about 55,000 in number. The test period ran for twelve days. During the first seven days, 8 pounds of treated cracked corn, 550 pounds of untreated cracked corn and 450 pounds of millet were dispensed about the cattle pens. Approximately twenty-five cattle used the pen throughout the trial period without being adversely effected.

The roosting site was transected as described in Example 9 above and mortality counts were made in similar manner. Projected kill of red-winged blackbirds, Brewer's blackbirds, grackles, yellow-headed blackbirds, English sparrows and cowbirds within the roost and based on the transected area indicated that approximately 1200 birds died at the roost from the 8 pounds of treated corn. A rapid decline of numbers of birds using the roost six days after the test was initiated was clearly evident, and large numbers of birds showing symptoms of 3-chloro-4-methylaniline poisoning were collected along roads miles from the feeding site.

*Example 11.—Preparation of 3-bromo-4-ethylaniline hydrochloride*

Activated iron (previously prepared by adding 20 ml. of concentrated hydrochloric acid to 150 g. of powdered iron) is added to 600 ml. of a hot benzene solution containing 15 g. of 3-bromo-4-ethylnitrobenzene (J. P. Lambooy, J. Am. Chem. Soc., 72, 2804 (1950)). The solution is heated at reflux for 8 hours as 60 ml. of water is slowly introduced. Upon cooling, the iron is removed by filtration, the benzene filtrate dried with magnesium sulfate, and the 3-bromo-4-ethylaniline hydrochloride is precipitated by passing dry hydrogen chloride through the solution.

*Example 12.—Preparation of 3-chloro-p-toluidine trichloroacetate*

Trichloroacetic acid (4.9 g.) dissolved in a minimum amount of ethanol is added to 4.25 g. of 3-chloro-p-toluidine. Water is added to the solution to the cloud point, and upon cooling the trichloroacetate salt is precipitated.

*Example 13.—Preparation of 3-chloro-p-toluidine picrate*

To picric acid (4.6 g.) dissolved in 75 ml. of ethanol is added to 2.8 g. of 3-chloro-p-toluidine. The picrate salt is precipitated from the resultant homogeneous solution by addition of water.

*Example 14.—Preparation of 3-chloro-4-methyl-N-methylaniline hydrochloride*

13.7 grams of 3-chloro-4-methyl-N-methylaniline is dissolved in a mixture of 10 cc. concentrated hydrochloric acid and 40 cc. of water. Cooling at 10° for 30 minutes causes the solution to deposit 11.3 grams of white crystalline product, melting point 192–194°.

*Example 15.—Preparation of 3-chloro-N,N-dimethyl-4-methylaniline hydrochloride*

7.1 grams of 3-chloro-N,N-dimethyl-4-methylaniline is dissolved in a mixture of 10 cc. of concentrated hydrochloric acid and 40 cc. of water. The solvent is evaporated in vacuo, the residual oil dissolved in 100 cc. of hot ethanol, treated with decolorizing carbon, and refrigerated for 1 hour at 0° to give 6.1 grams of white crystalline product, melting point 166.5–167°.

*Example 16.—Preparation of benzylidine-3-chloro-4-methylaniline*

21.2 grams of benzaldehyde and 28.3 grams of 3-chloro-4-methylaniline are stirred for 15 minutes and poured into 75 cc. of ethanol. Crystallization takes place immediately, giving 40.3 grams of pale yellow crystals, melting point 61–62°.

*Example 17*

Sufficient quantities of 3-chloro-4-methylaniline hydrochloride are dissolved in water to produce 1%, 0.5% and 0.25% solutions. Three groups of 10 chicks each are then placed in separate large containers and 20 cc. of the solutions are sprayed as coarse droplets on each group, respectively, over a period of 2 minutes. The birds are wet through the feathers to the skin. The birds are removed from the containers and placed in separate cages where they are permitted to feed and drink ad libitum on a commercial chick diet. Within five days after spraying, 100% of the birds sprayed with the 1% solution are dead, and 70% and 30% of the birds sprayed with 0.5% and 0.25% solutions, respectively, are dead.

We claim:
1. A method of controlling undesirable birds which comprises exposing them to an effective amount of a compound selected from the group consisting of the formula:

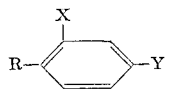

wherein R is lower alkyl, X is halogen, Y is selected from the group consisting of $NO_2$,

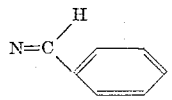

and

groups wherein $R_1$ is selected from the group consisting of hydrogen, lower alkyl and lower alkanoyl and $R_2$ is selected from the group consisting of hydrogen and lower alkyl and acid addition salts of said compounds.

2. A method of controlling undesirable birds which comprises exposing them to a composition containing a major amount of a carrier and a minor and effective amount of a compound selected from the group consisting of the formula:

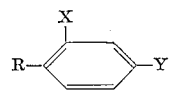

wherein R is lower alkyl, X is halogen, Y is selected from the group consisting of $NO_2$,

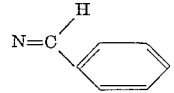

and

groups wherein $R_1$ is selected from the group consisting of hydrogen, lower alkyl and lower alkanoyl and $R_2$ is selected from the group consisting of hydrogen and lower alkyl and acid addition salts of said compounds.

3. A method according to claim 2 in which the compound is 3-iodo-4-methylaniline hydrochloride.
4. A method according to claim 2 in which the compound is 3-bromo-4-methylaniline hydrochloride.
5. A method according to claim 2 in which the compound is 3-chloro-4-methylaniline sulfate.
6. A method according to claim 2 in which the compound is 3-chloro-4-methylaniline hydrochloride.
7. A method according to claim 2 in which the compound is 3-chloro-4-methylaniline.
8. A method according to claim 2 in which the compound is 3-bromo-4-methylaniline.
9. A method according to claim 2 in which the compound is 3-iodo-4-methylnitrobenzene.
10. A method according to claim 2 in which the compound is 3-bromo-4-methylnitrobenzene.
11. A method of controlling undesirable birds according to claim 2 wherein the composition is applied as a food bait.
12. A method of controlling undesirable birds according to claim 2 wherein the composition is applied to the roosting and feeding areas of the said birds and on crops subject to damage by said birds.
13. A method of controlling undesirable birds according to claim 2 wherein the active compound is applied to said birds as a component of sprays and dusts.
14. A method of controlling birds by feeding an avicidal composition comprising a food bait containing at least about 15 p.p.m. of an active ingredient selected from the group consisting of the formula:

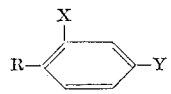

wherein R is lower alkyl, X is halogen, Y is selected from the group consisting of $NO_2$,

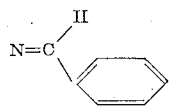

and

wherein $R_1$ is selected from the group consisting of hydrogen, lower alkyl and lower alkanoyl and $R_2$ is selected from the group consisting of hydrogen and lower alkyl and the acid addition salts of said compounds.

15. A method of controlling birds by treating seeds and other edible portions of plants with a sufficient amount of a composition comprising a carrier and a compound selected from the group consisting of the formula:

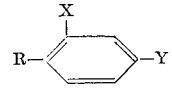

wherein R is lower alkyl, X is a halogen, Y is selected from the group consisting of $NO_2$,

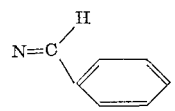

and

and groups wherein $R_1$ is selected from the group consisting of hydrogen, lower alkyl and lower alkanoyl and $R_2$ is selected from the group consisting of hydrogen and lower alkyl and the acid addition salts of said compounds, to provide a concentration of at least about 15 p.p.m. of said compound on said materials requiring protection.

No references cited.

JULIAN S. LEVITT, *Primary Examiner.*